Jan. 11, 1927. 1,614,245

E. J. JANAC

MILLING MACHINE ATTACHMENT

Filed May 13, 1925

Inventor:
Edward J. Janac,
by Fisher, Towle, Clapp & Soans, Attys

Patented Jan. 11, 1927.

1,614,245

UNITED STATES PATENT OFFICE.

EDWARD J. JANAC, OF CHICAGO, ILLINOIS.

MILLING-MACHINE ATTACHMENT.

Application filed May 13, 1925. Serial No. 29,863.

My invention relates to metal working and more especially to a die sinker's radius finisher or attachment for milling machines or cutters, or similar machines designed for cherrying operations, radius finishing or for finishing concaved recesses in die castings and the like, especially where the recesses are narrow.

Experience in work of the above class has shown that it is best to rough the work out, allowing anywhere from $\frac{1}{16}''$ to $\frac{3}{16}''$ for finishing, using an end mill for roughing and a cherrying mill or $\frac{3}{8}''$ square tool bits for finishing, but under certain conditions, it is desirable to use a milling cutter in preference to using the tool bits as will be hereinafter more fully explained. With my device, the gear can generally be lowered in the work after the latter is roughed out with an end mill and the gear will not be in the way. On the other hand, there will be plenty of room on all sides of the gear, thus rendering it possible to employ milling cutters or tool bits as hereinbefore mentioned.

The present invention therefore comprehends an attachment for milling or similar machines which is designed for radius finishing or for finishing concave recesses in die castings and the like, which will permit this work to be efficiently and expeditiously carried out and which is especially capable of working in narrow recesses in which present devices of this character are incapable of operation. The device involves a novel, simple and practical structure which may be economically manufactured and which can be easily attached to a milling machine, or other similar machine, and quickly removed therefrom, in addition to permitting universal adjustment around the drive shaft of the machine as an axis to present the cutters to recesses extending angularly in different directions, and by which tool bits or milling cutters may be interchangeably used and quickly applied or removed.

The invention also resides in certain novel details of construction and the arrangements of parts to be hereinafter more fully specified.

Figure 1:
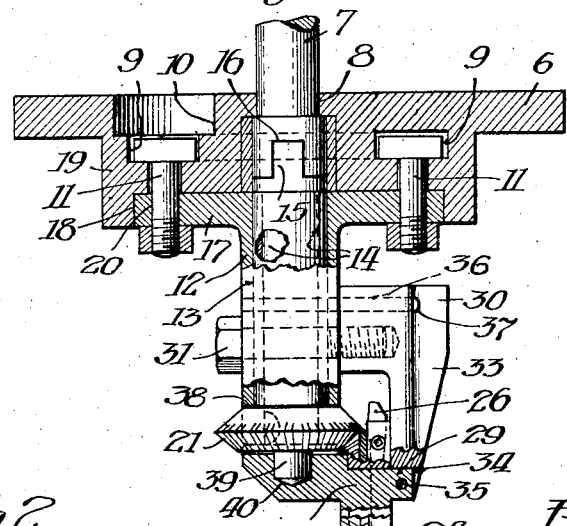
Fig. 1 is a central longitudinal sectional view partly broken away and in elevation of a milling machine attachment embodying the invention and showing the manner of applying the same to a milling machine.

Referring to the drawings, and especially Figure 1, in which the device is shown in assembled form, 6 designates a plate adapted to be applied to the frame of a milling machine and to encircle the drive shaft 7 thereof which projects through an aperture 8 centrally in the plate. The plate is formed with a circular T-shaped groove or slot 9 in the bottom and a circular opening 10 at the top communicating with the slot to permit insertion of bolts 11 into the slot 9, which receives the heads of the bolts 11 and which support the device as shown in Figure 1 and permits turning or rotatable adjustment of the device therein. As shown in the latter figure, the device comprises a narrow bearing sleeve or frame 12 extending across the axis of the shaft 7 and having a vertical aperture or bore 13 to receive a shaft 14, which is provided with a rib 15 extending across the upper end, forming a detachable driving connection with the slot 16 at the lower end of the drive shaft 7 of the milling machine, and which is preferably enlarged for this purpose to engage a shoulder of the plate 6 around the aperture 8 and provided with a bearing sleeve or bushing as shown. The frame 12 has an annular flange 17 extending around the upper end which seats within a corresponding bottom recess 18 of the carrying plate 6 or a reduced downward extension 19 thereof, and is secured by the bolts 11 having their heads engaged and held against turning in the slot 9 as heretofore described, and passing through apertures 20 in the flange 17.

Figure 2:
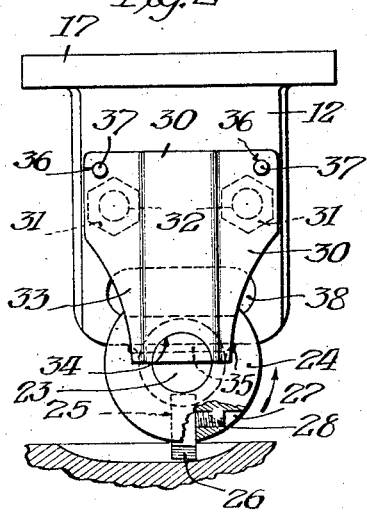
Fig. 2 is a front elevation of the device shown in Figure 1 and illustrating the action thereof.

The shaft 14 has a beveled gear 21 fixed on the lower end and meshing with a beveled gear 22 at one side of the frame 12. This frame is widened out at both sides of the shafts 7 and 14 in a plane parallel to the plane of the gear 22, as shown in Fig. 2, and at the lower end has an opening 38 to accommodate the gear 21 and a somewhat large laterally extending horizontal stud bearing 23, upon which the gear 22 is free to rotate in mesh with the gear 21. The stud 23 extends below the frame proper 12 which is cut out or off above the center or axis of the stud 23 to permit projection and clearance of the gear 22 and cutter now to be described. This gear wheel 22 has attached thereto or formed as a part thereof, a head 24 having sockets 25 at diametrically opposite points or otherwise formed to take and hold the tool bits 26, which do the cutting. These tool bits may be of various types well known in this art, and as illustrated, the head 24 is provided with threaded openings 27 extending at right angles to the sockets 25 from the periphery of the head for receiving set screws 28 for securing the bits in adjusted positions.

The cutter head 24 is also bored out the same as the gear 22, to receive the bearing stud or projection 23, and the latter, beyond the cutter head 24, is formed at the upper part with a half round extension 29. A bracket 30 is secured to the frame 12 by bolts 31, which are passed through apertures 32 of the frame 12, and has an arm 33 depending at the outer side of the cutter head 24 and provided with a semi-circular seat 34 engaging the extension 29 of the bearing stud 23. A pin 35 is applied through the bifurcated lower end of the arm 33 and the extension 29 for locking the parts together. In order to correctly position the bracket 30 and facilitate the application of the screws or bolts 31 through the frame and into the threaded sockets of the bracket as disclosed more particularly in Figures 1 and 2 of the drawings, holes 36 are also provided adjacent each aperture 32 for receiving taper pins 37 in the manner of dowel pins. It may also be remarked that the lower portion of the frame 12 is provided with a transverse slot 38 to accommodate the beveled gear 21, and the lower end of the shaft 14 is reduced as at 39 and has bearing in a socket 40 of the lower portion of the frame from which the stud bearing 23 extends.

With this construction, the frame 12 may be turned to any desired angular position, horizontally or vertically, depending upon the type of milling or other machine to which the attachment is applied, without loosening the bolts or nuts thereof, which connect the plate 17 to the carrier 6, so that the cutter is arranged at any desired position around the axis of the drive shaft 7. The bracket 30 and arm 33 thereof, affords a substantial brace for the cutter and inasmuch as the frame 12 and bracket 30 terminate at an elevation above the axis of the cutter, the latter is capable of working in narrow recesses in which present devices of this character are incapable of operation. The beveled gear 22 may, in some cases, be recessed into the face of the cutter head 24 if desired, so that the tool will operate in even narrower recesses than would otherwise be possible, as shown.

Figure 5:
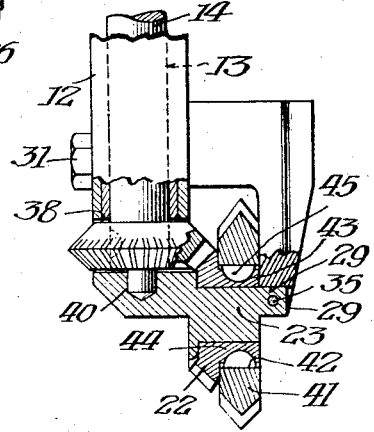
Fig. 5 is a fragmental sectional elevation of the device showing another form in which a milling cutter is employed in lieu of tool bits.
Figure 4:
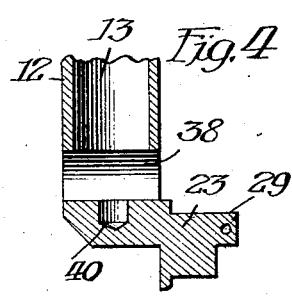
Fig. 4 is a fragmental detail sectional view of a part including a stud bearing of the device.
Figure 3:
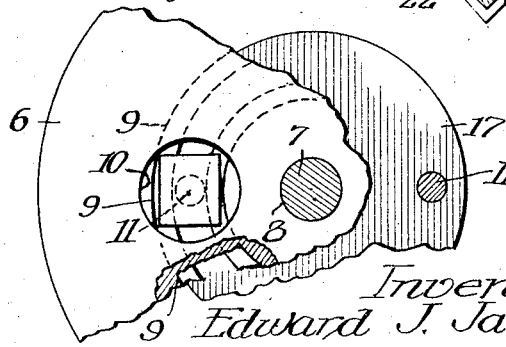
Fig. 3 is a fragmental sectional plan view of the device shown in Figure 1.

In the embodiment of the invention shown in Figure 5 of the drawings, the structure is the same, except that the cutter head is arranged to use the ordinary milling cutters of various types, instead of the bits 26. As shown, the milling cutter 41 is provided with a plurality, preferably two keyways 42 co-acting with keyways 43 of semi-circular or concaved form in the collar or hub 44 of the beveled gear 22. These Woodruf keyways are designed to receive the Woodruf keys 45 which secure the milling cutter detachably in position and permit different types and sizes of milling cutters to be conveniently used. In either case, the work is preferably roughed out by using an end or vertical mill and then finished by the present cherrying or radius finishing attachment using the tool bits or milling cutter as shall be found preferable. In die sinking work, it will be found that the gear can be lowered in the work after it is roughed out with an end mill and the gear at the side of the cutter head will not be in the way, but will allow plenty of room on all sides of the gear for effective work in an expeditious and economical manner.

While I have shown and described my invention in a preferred form, I am aware that various changes and modifications may be made without departing from the principles of my invention, the scope of which is to be determined by the appended claims.

I claim as my invention:

1. In an attachment for milling machines or the like having a drive shaft, a frame carried by the machine, a driven shaft journalled in the frame and having operative connection with the drive shaft, said frame being formed with a recess seating the lower end of said driven shaft, said frame having a laterally extending stud bearing, a beveled gear fixed to the shaft, a second beveled gear journalled on the stud bearing in mesh with the first gear, a cutter head fixed to the second gear to rotate therewith on the stud bearing and having peripheral cutters projecting outwardly of the periphery of the second gear.

2. In an attachment for milling machines or the like having a drive shaft, a rotatably adjustable frame carried by the machine, a driven shaft journalled in the frame and having operative connection with the drive shaft, the lower end of the frame being formed to provide a thrust bearing for the driven shaft, said frame having an integral stud bearing extending horizontally therefrom, a beveled gear fixed to the shaft, a second beveled gear journalled on the stud a shoulder at the inside abutting the second gear having a hub extension, a cutting tool keyed to the hub extension in contact with the second gear, and a bracket arm on the frame and bracing the stud bearing outwardly of the cutting tool.

3. In an attachment for milling machines or the like having a drive shaft, a frame carried by the machine and having a slot therethrough, a driven shaft journalled in the frame and having operative connection with the drive shaft, said frame having a stud bearing, a beveled gear fixed to the shaft, and mounted in the slot, a second beveled gear journalled on the stud bearing in mesh with the first gear, the stud bearing having a shoulder at the inside abutting the second gear to take up end thrust and limit the movement thereof toward the first gear, a cutter head in contact with and fixed to rotate with the second gear on the stud bearing and having peripheral cutters projecting outwardly of the second gear, and a bracket fixed to the frame spaced from the gears and having an offset arm engaging the stud bearing outwardly of the cutter head.

4. In an attachment for milling machines or the like having a drive shaft, a frame carried by the machine, means to adjust the frame about the shaft, a driven shaft journalled in the frame and having operative connection with the drive shaft, the lower end of the frame formed to provide a thrust bearing for the shaft, said frame having a stud bearing, a beveled gear fixed to the shaft, a second beveled gear journalled on the stud bearing in mesh with the first gear, the stud bearing having a shoulder abutting the second gear to take up end thrust and limit the movement thereof toward the first gear, a cutter head fixed to rotate with the second gear on the stud bearing and having peripheral cutters projecting outwardly of the second gear, and the second gear being set in the cutterhead, a bracket fixed to the frame spaced from the gears and having an offset arm engaging the stud bearing outwardly of the cutter head.

5. In combination with a drive shaft, a carrying plate on which the shaft is journalled and having a circular T-shaped slot, a frame having a flange mounted in a recess of the plate, bolts connecting the flange to the plate in the slot to permit angular adjustment of the frame on the plate, a shaft journalled in the frame and having interfitting drive connection with the first shaft in the plate, an angular bracket arm projecting from one side of the frame and secured thereto upon opposite sides of the shaft thereof, said frame having a slot and a communicating bearing for the outer end of said shaft, a beveled gear fixed to the shaft in the slot, a stud bearing extending laterally from the end of the frame beneath the bracket arm and having an extension secured to the bracket arm; a beveled gear journalled against endwise movement on the bearing and in mesh with the first gear, and a circular cutter member fixed to the second gear in a plane substantially parallel to the arm and second gear and positioned between the same, the peripheral cutters of said member projecting beneath the second gear.

6. In an attachment for milling machines or the like having a drive shaft, a frame carried by the machine having a transverse slot formed therein, a driven shaft journalled in the frame and having operative rib and slot connection with the drive shaft, said frame having a stud bearing formed therewith and extending laterally below the frame and transverse slot, a beveled gear fixed to the shaft, a second beveled gear journalled on the stud bearing in mesh with the first gear, a cutter head fixed to and in contact with the second gear to rotate therewith on the stud bearing and having peripheral cutters projecting outwardly of the periphery of the second gear.

EDWARD J. JANAC.